United States Patent [19]

Theliander et al.

[11] Patent Number: 4,760,650

[45] Date of Patent: Aug. 2, 1988

[54] METHOD OF DRYING PARTICULATE MATERIAL

[76] Inventors: Hans Theliander, 21 B Övre Husargatan, S-413 14 Göteborg; Urban Grén, 3 Tvärgatan, S-431 36 Mölndal, both of Sweden

[21] Appl. No.: 800,707

[22] Filed: Nov. 22, 1985

[30] Foreign Application Priority Data

Nov. 27, 1984 [SE] Sweden ............................ 8405982

[51] Int. Cl.$^4$ ............................................ F26B 3/10
[52] U.S. Cl. ............................................ 34/35; 34/10; 34/57 A; 34/86; 110/224; 110/234; 110/245
[58] Field of Search ............... 110/218, 224, 234, 227, 110/245; 34/10, 57 R, 57 A, 32, 36, 37, 35, 86

[56] References Cited

U.S. PATENT DOCUMENTS

| | | | |
|---|---|---|---|
| 2,622,342 | 12/1952 | Goulounes et al. | 34/169 |
| 3,186,102 | 6/1965 | Brociner et al. | 34/57 A |
| 4,311,670 | 1/1982 | Nieminen et al. | 34/10 |
| 4,525,934 | 7/1985 | Hess et al. | 34/57 R |

FOREIGN PATENT DOCUMENTS

| | | |
|---|---|---|
| 1116472 | 1/1982 | Canada . |
| 419974 | 11/1980 | Sweden . |
| 2036787A | 7/1980 | United Kingdom . |

*Primary Examiner*—Larry I. Schwartz
*Attorney, Agent, or Firm*—Cushman, Darby & Cushman

[57] ABSTRACT

The invention relates to a method of drying a particulate material which is thereafter to be heat-treated, the material and a gaseous drying medium being brought in contact with each other in a drying apparatus, where water is made to pass from the material to the drying medium by heating. According to the invention a pressure above atmospheric is maintained in the drying apparatus and the drying medium in the drying apparatus is substantially steam. Heating is carried out by means of excess heat generated in the heat treatment.

14 Claims, 1 Drawing Sheet

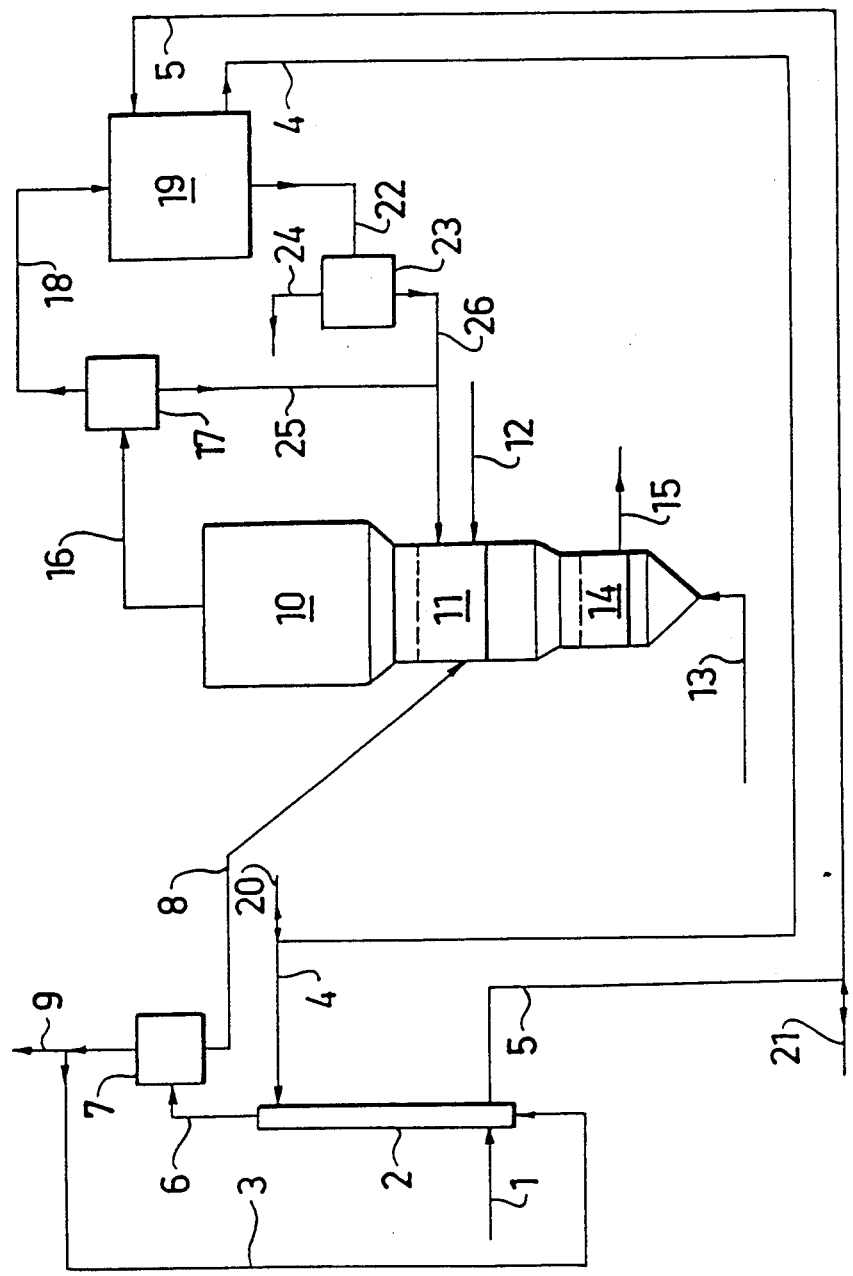

METHOD OF DRYING PARTICULATE MATERIAL

This invention relates to a method for drying particulate materials which are to be heat treated later on. The invention is particularly suitable for the drying of lime sludge in the recovery system for chemicals in a sulfate pulp mill, but is not restricted to this use only. The method can advantageously be utilized in all processes where a moist particulate material is first to be dried and then heated to be subjected to a chemical reaction. Examples of such processes are cement preparation, polyphosphate preparation and the drying and roasting of ores and minerals.

In said industries drying as well as heat treatment, such as burning or roasting, are processes which are extremely energy consuming. With increasing prices of energy it has therefore become of ever greater interest to optimize these processes in regard of the energy consumption. By the method of the invention, a considerable improvement of the utilization of available energy is obtained. Moreover, the process can be made easier to control, so that a better and more uniform product is obtained.

According to the invention, these advantages are obtained in a process wherein particulate material and a gaseous drying medium are brought into contact with each other in a drying apparatus wherein water is made to pass from the material to the drying medium by heating. What characterizes the invention is that a pressure above atmospheric is maintained in the drying apparatus, the drying medium in the drying apparatus consists substantially of steam and the heating is carried out by means of excess heat generated in the heat treatment.

In order to illustrate the invention more closely, it will be described in the following in detail how it is carried out with reference to the drying and burning of lime sludge (calcium carbonate) for the preparation of quick lime in a sulfate pulping process. As indicated above, however, it is not intended to restrict the invention merely to this use.

The process of drying and burning of lime sludge can be divided into a number of steps. In the first step the wet lime sludge is heated to about 100° C. so that the included water is evaporated. After this drying, the temperature is raised to 850°–1000° C. in order to achieve a sufficiently high velocity for the reaction

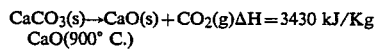
$$CaCO_3(s) \rightarrow CaO(s) + CO_2(g) \quad \Delta H = 3430 \text{ kJ/Kg}$$
$$CaO(900° C.)$$

The drying as well as the burning steps are thus processes which consumes much energy.

At present reburning of lime sludge is usually carried out in one of two different processes, viz. in a rotary furnace or in a fluidized bed. The most common process is that in a rotary furnace.

A rotary furnace is designed as a rotary tubular furnace arranged slightly inclined to the horizontal plane. At the lower hot end of the furnace, fuel is introduced and burned and the burnt lime obtained as reaction product is discharged. At the upper cool end of the furnace the wet lime sludge is introduced and the flue gases from the combustion of the fuel are let out. By the rotation and inclination of the furnace, the lime sludge will be moved slowly downwards towards the hot end. The lime sludge will be heated and dried in a first drying zone in the furnace by the hot flue gases moving countercurrently and the contact is usually improved between the lime sludge and the gases by an arrangement of hanging chains within the furnace. For this reason the drying zone is often also called "the chain zone". After this zone, the dry content of the lime sludge is close or equal to 100%. Any remaining water is evaporated while the lime sludge in a following zone is heated up to the reaction temperature. The real burning of the lime sludge is effected in the so-called burning zone, and a growth of the crystals of calcium oxide formed takes place in a following sintering zone. The different zones are not distinctly defined but pass gradually into each other.

The lime discharged from the hot end of the furnace is cooled in lime coolers by means of air which is then used as in-going air to the combustion of the fuel. The lime is thereafter conveyed to storage silos to be reused later in the preparation of white liquor in the pulping process.

The construction and function of a rotary furnace according to the above have been known for a long time to those skilled in the art, and therefore a more detailed description is not required.

Two complicated processes take place at the same time in a rotary furnace of the type described, namely a drying process and a heterogeneous chemical reaction. Due to this, the total process will be very difficult to control, and in practice, lime of a varying quality will be produced.

In a system with a fluidized bed, the difficulties regarding the process control are eliminated in that drying and burning of the lime sludge are carried out in two separate devices. According to this process the wet lime sludge is first mixed with a part of the lime sludge already dried in order to facilitate the handling of the material and is then led into a drier, preferably of the pneumatic type where it is dried with flue gases from the burning step. After drying, the lime sludge is separated from the flue gases, usually by means of a cyclone, and a part of the dried lime sludge is recycled to be mixed with the incoming wet lime sludge. The remaining part of the dried lime sludge is led to the burning step consisting of a reactor with a fluidized bed and is introduced into the reactor bed which substantially consists of burnt lime. The temperature of the bed is about 900° C. and is maintained by combustion of fuel in the bed. The gases leaving the bed will have about the same temperature and are to be used for drying the lime sludge in the drying step. However, because of their high temperatures they cannot be directly conducted to the drying step but must first be cooled, usually by injection and evaporation of cold water.

In the bed, the particles will adhere to each other to form bigger aggregates, as sodium compounds are formed which have a lower melting point than 900° C. When the particles have become sufficiently big, they can no longer be kept suspended by the gas flow but fall down to a bed located below. This bed serves as a heat exchanger between incoming combustion air and outcoming lime which is then conveyed to a storage silo.

The design and function of a plant for the burning of lime sludge in a fluidized bed have also been well-known to those skilled in the art for a long time and need not be further described.

A plant for burning lime sludge in a fluidized bed yields a very even quality of the resulting lime. On the other hand, the process has a much inferior heat economy compared to the process with a rotary furnace. This is due to the necessary intermediate cooling of the flue gases.

The indicated disadvantages of the previously known processes are now eliminated by the method of the invention and a lime of an even and high quality is obtained with a good heat economy.

An apparatus for carrying out the method is shown schematically in the drawing.

According to the drawing, wet lime sludge is supplied through the conduit 1 to the drying apparatus 2. Depending on the dry content of the lime sludge and the type of feeding device, it may in certain cases be suitable to admix a certain share of dried lime sludge to the wet sludge so that better handling properties are obtained.

The drying apparatus 2 is at a pressure above atmospheric and the atmosphere therein consists substantially of steam which is supplied through the conduit 3. In the FIGURE, the drying apparatus is intended to be a pneumatic drier with the steam as the carrier medium, which is a suitable embodiment. However, the invention is not restricted to merely this type of drying apparatus but other types are also possible such as a drum drier, screw drier, bed drier, drier with a fluidized bed or the like. What is essential for the invention is that the drying apparatus is at a superatmospheric pressure and that the atmosphere therein consists substantially of steam.

A suitable working pressure of a drying apparatus according to the invention is 0.1-25 bar, preferably 0.5-15 bar and especially 1-7 bar pressure above atmospheric. The temperature at drying is then conveniently 103°-250° C., preferably then 112°-210° C. and primarily 120°-180° C.

The steam in the drying apparatus must necessarily be superheated at the prevailing pressure, as this constitutes the driving force for water to pass from the material to the vapor phase. The degree of superheating is not critical but can be determined starting from the preferred working conditions. This lies within the competence of those skilled in the art. Steam for heating the contents of the drying apparatus 2 is led to the drying apparatus 2 through the conduit 4, is heat exchanged in the drying apparatus indirectly against the steam introduced with the lime sludge, and is discharged as a condensate through the line 5. As a heating medium, saturated steam, the saturation pressure of which is higher than that of the carrier steam introduced with the lime sludge, is preferably used. Heating steam will thereby condense on the heat exchanging surface and the heat of condensation will overheat the carrier steam. The carrier steam in turn gives off the heat to the wet lime sludge which is heated such that its water content is evaporated.

If the drying apparatus is a pneumatic drier, it is suitable that it is formed as a tube heat exchanger. In this way an optimal contact is obtained between the heating steam and the carrier steam.

It is not strictly necessary to use steam as heating medium but any hot gas can be used, such as flue gases from the subsequent burning of the lime sludge. However, it is essential that the temperature of the gas exceeds the saturation temperature of the carrier steam.

The dried lime sludge is discharged together with the carrier steam through the conduit 6 and is separated from the steam phase in the separation device 7, e.g. a cyclone. The dry lime sludge is then led through the conduit 8 to the following burning step.

In the course of the drying process, the amount of steam in the drying apparatus has increased through the evaporation of the water accompanying the wet lime sludge. Thus it is necessary to withdraw a part of the steam to avoid accumulation of steam in the system. This is carried out through the branch line 9 from the conduit 3 through which steam is recirculated from the separation device 7 to the inlet in the drying apparatus 2. The steam taken from the system can be used for various purposes, such as heating. As the steam may contain minor amounts of particles of lime sludge, it may be necessary to use an intermediate steam transformer (not shown), if very pure steam is required for the intended use.

The steam not taken out of the system is recycled through the conduit 3 to the inlet of the drying apparatus 2 in order to be mixed again with wet lime sludge. If the lime sludge is very wet, it may be suitable to superheat the recycled steam before it is brought in to contact with the lime sludge. This will increase the velocity of the drying at the start of the drying process. Superheating is provided by means of an overheater (not shown), arranged in the return conduit 3.

The dried lime sludge is conveyed through the conduit 8 to a reactor 10 for burning. In the drawing is shown a reactor with a fluidized bed, which is a preferred embodiment, but other types of reactor can be used, such as a rotary furnace. The lime sludge is led into the reactor bed 11 to which fuel is also supplied through the conduit 12. Air for fluidizing of the bed and combustion of the fuel is supplied through the conduit 13 at the bottom of the reactor.

As has been stated previously, the lime particles formed in the course of the combustion will be sintered to form bigger particles and fall down to the lower bed 14. From this the burnt lime is taken out through the conduit 15 and is then led further to a lime cooler (not shown) and a storage silo. The heat in the discharged lime can be utilized in that the combustion air is used as a coolant before it is introduced in the reactor through the conduit 13.

The flue gases from the reactor 10 are led away through the conduit 16 to a dust separator 17, such as a cyclone. From this the cleaned flue gases are led through the conduit 18 to a flue gas boiler 19 where their heat content is recovered by steam generation. The steam formed is a very useful carrier of energy and can for example be used for heating or generation of electric energy. If a suitable temperature and pressure are chosen, the steam formed can be used as the heating steam in the drying step, as shown in the drawing. The steam is then led from the flue gas boiler through the conduit 4 to the drying apparatus 2 and condensate is taken out through the conduit 5 and recycled to the flue gas boiler. A possible excess or deficit of heating steam is balanced through the line 20 and a possible excess or deficit of condensate is balanced through the conduit 21. The extent to which the steam produced in the waste heat boiler is sufficient for drying the lime sludge is dependent of the dry content of the incoming lime sludge. The flue gases from the flue gas boiler 19 are led through the conduit 22 to a further dust separator 23 and are then carried away through the conduit 24, e.g. to the atmosphere or to additional purification. The dust separated in the dust separator 17 and 23 is recycled through the conduits 25 and 26, respectively, to the reactor bed 11 and the burning process.

It is also possible, as an alternative, to use the flue gases from the burning reactor for heating primary air to various combustion plants or as a heating medium in the drying apparatus for the lime sludge. However, this means that larger heat exchanger surfaces must be installed which makes the process more expensive. The use of the flue gases directly as heating medium in the lime sludge drier also provides a reduced flexibility of the process but is technically quite feasible.

The embodiment shown above with indirect heat transfer from the heating medium to the drying medium is especially preferred but is not the only possible one. It is also possible to lead superheated steam from the flue gas boiler 19 through the conduit 4 to a direct contact with the material to be dried in the drying apparatus 2. The return conduit 5 for condensate is then omitted and instead a part of the steam withdrawn through the conduit 9 can first be used for some other purpose such as heating or power generation and then be recycled in a suitable amount to the waste heat boiler.

It has previously been mentioned that one of the advantages of burning in a fluidized bed is the simple control of the process which yields a very even quality of the prepared quicklime. By the present invention, the control of the process will also be simple if a rotary furnace is used for burning as compared with both drying and burning in the rotary furnace. Provided burning is carried out with a constant excess of air, the form of the combustion flame is not changed, the temperature of the introduced material is constant and the heat value of the fuel is constant, which conditions can normally be assumed to apply, the temperature of the outgoing flue gases is an excellent parameter for the control of the amount of material led through the furnace. This means that a good process control can be achieved and, as a consequence of this, an even quality of the lime produced.

The separate components included in the plant, such as heat exchangers, dust separators, reactor, conduits etc. are of a conventional design and can easily be selected by those skilled in the art when their function has been established. Likewise, various auxiliary equipment which has not been shown in the schematic drawing, is required in the plant as well, such as conveyors, measuring and controlling devices etc. Such equipment is also of a conventional design and can easily be selected by those skilled in the art on the basis of the demands made on their function.

By the present invention there is provided a simple method requiring little energy for drying particulate materials. As the drying has been combined with a following heat treatment of the material, its advantages as regards energy saving and improved process control can be achieved such that improvements of the quality of the final product can also be obtained.

The invention has been described in the foregoing with a special reference to a process for drying of lime sludge, which is then to be burnt in the recovery of chemicals in a sulfate pulping process. This is a preferred embodiment, but the invention is not restricted to this use only, but can be used in any case where a particulate material is to be dried and the dried material thereafter is to be subjected to a heat treatment. The changes in equipment and processes required in each specific case are clearly apparent to those skilled in the art.

Other variants and modifications of the invention are also possible within the scope of claims.

What is claimed is:

1. Method of drying a particulate material which is subsequently heat-treated by a process in which heat energy is first generated and then partially absorbed by the material so that excess heat is present, the material and a gaseous drying medium being brought into direct contact with each other in a drying apparatus, where water is made to pass from the material to the drying medium by heating, characterized in that a pressure above atmospheric is maintained in the drying apparatus, the drying medium in the drying apparatus consists substantially of steam, and the heating is carried out by means of the excess heat formed in the heat treatment.

2. Method as claimed in 1, characterized in that a pressure of 0.1–25 bar, preferably 0.5–15 bar, and especially 1–7 bar over atmospheric is maintained in the drying apparatus.

3. Method as claimed in claim 1, characterized in that the heating is carried out by indirect heat transfer from a heating medium which has been heated by said excess heat.

4. Method as claimed in claim 3, characterized in that the temperature of the heating medium is higher than the saturation temperature of the steam used as drying medium at the prevailing pressure in the drying apparatus.

5. Method as claimed in claim 3, characterized in that saturated steam is used as heating medium.

6. Method as claimed in claim 1, characterized in that the drying medium is separated from dried material and is recycled to be brought in contact with moist material introduced into the drying apparatus.

7. Method as claimed in claim 6, characterized in that an amount of steam is withdrawn from the recycled drying medium, said amount corresponding to the amount of water removed from the material in the drying process.

8. Method as claimed in claim 6, characterized in that the recycled drying medium is superheated before it is brought into contact with the moist material.

9. Method as claimed in claim 1, characterized in that the drying apparatus includes a pneumatic drier designed as a tube heat exchanger, the drying medium serving as a carrier medium for the particulate material.

10. Method as claimed in claim 1, characterized in that the particulate material consists of wet lime sludge, which is burnt to lime after drying, steam generated in a flue gas boiler arranged after the burning step being used as a heating medium to heat the drying medium and the particulate material in the drying apparatus.

11. A method of drying wet particulate material which is subsequently subjected to a heat treatment stage in which heat is consumed and in which excess heat is used to form steam, said method comprising feeding the wet particulate material to a drying apparatus; passing steam formed by the excess heat from the heat treatment stage and feeding the steam at superatmospheric pressure to the drying apparatus and into direct heat exchange contact with the particulate material in the apparatus and maintaining in the apparatus an atmosphere consisting substantially of steam at superatmospheric pressure to thereby evaporate water from the particulate material; separating the steam and evaporated water from the particulate material; and passing the particulate material to the heat treatment stage.

12. A method of drying wet particulate material which is subsequently subjected to a heat treatment stage in which heat is consumed and in which a hot gaseous medium is formed, said method comprising feeding the wet particulate material through a flow path in an indirect heat exchange drying apparatus; passing hot gaseous medium from the heat treatment stage and feeding the hot gaseous medium through a separate flow path in the apparatus so as to be in indirect heat exchange with the wet particulate material in the apparatus to thereby heat the particulate material and evaporate water therefrom such that an atmosphere consisting essentially of steam at superatmospheric is in direct contact with the particulate material; separating the evaporated water from the particulate material; and passing the particulate material to the heat treatment stage.

13. A method of treating wet particulate material comprising: passing the wet particulate material in direct contact with steam at superatmospheric pressure in a drying apparatus to thereby dry the material by causing water to evaporate from the material and pass into the steam; separating the steam from the dry material and returning a portion of the steam to the drying apparatus for direct contact with fresh wet particulate material which is fed to the drying apparatus; generating heat energy and heat-treating the dry material with the heat energy to cause a chemical reaction of the material by consumption of part of the generated energy whereby excess heat energy is present; and transferring said excess heat energy to the steam and particulate material which are in direct contact with each other in the drying apparatus to thereby maintain said superatmospheric pressure in the drying apparatus.

14. A method as in claim 13 wherein said excess heat energy is transferred to the steam and particulate material by indirect heat exchange.

* * * * *